(12) United States Patent
AlTammar

(10) Patent No.: US 11,236,563 B1
(45) Date of Patent: Feb. 1, 2022

(54) AUTONOMOUS DOWNHOLE TOOL

(71) Applicant: SAUDI ARABIAN OIL COMPANY, Dhahran (SA)

(72) Inventor: Murtadha J. AlTammar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/942,994

(22) Filed: Jul. 30, 2020

(51) Int. Cl.
| | |
|---|---|
| *E21B 23/00* | (2006.01) |
| *E21B 41/00* | (2006.01) |
| *E21B 31/00* | (2006.01) |
| *H02K 7/18* | (2006.01) |
| *H02K 11/00* | (2016.01) |
| *E21B 43/25* | (2006.01) |
| *E21B 49/00* | (2006.01) |

(52) U.S. Cl.
CPC ............ *E21B 23/001* (2020.05); *E21B 31/00* (2013.01); *E21B 41/0085* (2013.01); *H02K 7/1823* (2013.01); *H02K 11/0094* (2013.01); *E21B 43/25* (2013.01); *E21B 49/00* (2013.01)

(58) Field of Classification Search
CPC .... E21B 23/001; E21B 41/0085; E21B 31/00; E21B 43/25; E21B 49/00; H02K 7/1823; H02K 11/0094
See application file for complete search history.

(56) References Cited

U.S. PATENT DOCUMENTS

| | | | | |
|---|---|---|---|---|
| 4,192,380 | A | * | 3/1980 | Smith ................. E21B 17/1021 166/104 |
| 5,392,715 | A | * | 2/1995 | Pelrine .................... F16L 55/28 104/138.2 |
| 7,560,856 | B2 | | 7/2009 | Chen et al. |
| 8,127,833 | B2 | | 3/2012 | Pabon et al. |

(Continued)

FOREIGN PATENT DOCUMENTS

| | | |
|---|---|---|
| CN | 202673274 U | 1/2013 |
| CN | 206360656 U | 7/2017 |

(Continued)

OTHER PUBLICATIONS

International Search Report and Written Opinion issued in Application No. PCT/US2020/047369, dated Mar. 11, 2021 (13 pages).

(Continued)

*Primary Examiner* — Brad Harcourt
(74) *Attorney, Agent, or Firm* — Osha Bergman Watanabe & Burton LLP

(57) ABSTRACT

An autonomous tool includes a tool body and turbine wheels coupled to the tool body. Each turbine wheel is retractable into the tool body and extendable out of the tool body. When the turbine wheels are extended out of the tool body, the axial axes of the turbine wheels can be positioned parallel to the axial axis of the tool body, allowing generation of mechanical energy from a fluid stream moving along the tool body, or positioned perpendicular to the axial axis of tool body, allowing the turbine wheels to roll along a tubular wall. Electrical generators are mechanically coupled to the (Continued)

turbine wheels to convert the mechanical energy produced by the turbine wheels into electrical energy. An energy storage stores the electrical energy for use by components of the tool.

20 Claims, 11 Drawing Sheets

(56) References Cited

U.S. PATENT DOCUMENTS

| | | | |
|---|---|---|---|
| 8,511,373 | B2 | 8/2013 | Tosi et al. |
| 2008/0156477 | A1* | 7/2008 | Aivalis .................. E21B 23/08 166/53 |
| 2009/0166045 | A1 | 7/2009 | Wetzel et al. |
| 2013/0068479 | A1 | 3/2013 | AlDossary |
| 2014/0014367 | A1 | 1/2014 | Hallundbæk |
| 2015/0167402 | A1 | 6/2015 | Chang |
| 2015/0218900 | A1 | 8/2015 | Hallundbæk et al. |
| 2015/0345260 | A1 | 12/2015 | Green et al. |
| 2016/0215579 | A1 | 7/2016 | Van Der Ende |
| 2017/0241242 | A1* | 8/2017 | Marshall .................. F01D 5/06 |
| 2019/0345785 | A1 | 11/2019 | Fleckenstein et al. |
| 2019/0368331 | A1 | 12/2019 | Vick, Jr. et al. |
| 2020/0157886 | A1 | 5/2020 | Fuglestad |

FOREIGN PATENT DOCUMENTS

| | | |
|---|---|---|
| EP | 2458137 A1 | 5/2012 |
| WO | 03062598 A1 | 7/2003 |
| WO | 2016153981 A1 | 9/2016 |

OTHER PUBLICATIONS

Liu, Qingyou et al., "Review, classification and structural analysis of downhole robots: Core technology and prospects for application", Robotics and Autonomous Systems, ScienceDirect, Elsevier B.V., vol. 115, Feb. 2019, pp. 104-120 (17 pages).

Arsalan, Muhammad et al., "Energy Harvesting for Downhole Applications in Open-hole Multilaterals", SPE-192970-MS, Society of Petroleum Engineers, Nov. 2018 (12 pages).

* cited by examiner

AUTONOMOUS DOWNHOLE TOOL

BACKGROUND

In the oil and gas industry, a completed well means that the well has produced or is ready to produce fluids from a subsurface reservoir. Typically, a production tubing is installed in the well to convey reservoir fluids from the well to the surface. After a well has been completed, various operations may be performed in the well that require running a tool through the production tubing and into the well using a wireline or coiled tubing. If the well has a horizontal lateral section, a tractor may be needed to pull the tool along the horizontal lateral section. Examples of operations that may be performed periodically in a completed well are production logging and well stimulation. Production logging is performed to obtain a production profile of a given formation interval and is important to monitoring well production profile over time. Well stimulation is performed to remove mineral and composite deposits in the well or in the formation near the well that may hinder well productivity or injectivity. The current practice of running tools downhole in order to perform these operations usually means that well production is interrupted during these operations, which adds to production cost, not to mention the health, safety, and environmental risks involved in frequently accessing a producing well.

SUMMARY

In a first summary example, an autonomous downhole tool includes a tool body having an axial axis and a plurality of turbine wheels coupled to the tool body. Each turbine wheel is movable separately to each of a first position in which the turbine wheel is retracted inside the tool body, a second position in which the turbine wheel is extended out of the tool body and an axial axis of the turbine wheel is parallel to the axial axis of the tool body, and a third position in which the turbine wheel is extended out of the tool body and the axial axis of the turbine wheel is perpendicular to the axial axis of the tool body. The apparatus includes a plurality of electrical generators mechanically coupled to the plurality of turbine wheels. The electrical generators convert mechanical energy produced by the turbine wheels to electrical energy. The autonomous downhole tool includes an energy storage electrically coupled to the electrical generators to store the electrical energy.

The autonomous downhole tool may include a fishing neck that is coupled to an end of the tool body. The fishing neck may be engageable by a downhole fishing tool for retrieval of the tool from a wellbore. The autonomous downhole tool may include at least one communication device coupled to the tool body for wireless communication. The autonomous downhole tool may include at least one wellbore operation tool coupled to the tool body. The wellbore operation tool may be selected from a production logging tool and a wellbore stimulation tool. The autonomous downhole tool may include a plurality of mechanisms operable to position the turbine wheels at each of the first position, the second position, and the third position. Each of the mechanisms may be coupled between a respective one of the turbine wheels and the tool body. Each of the mechanisms may include a mechanical arm having two arm parts coupled together by a rotary joint. Alternatively, each of the mechanisms may include a robot manipulator.

In a second summary example, a system includes a well penetrating a subsurface region, a tubing disposed in the well for transport of a fluid stream between the subsurface region and a surface region, and a downhole tool disposed in the well and further down the well than a bottom end of the tubing. The downhole tool includes a plurality of turbine wheels that are each movable separately to each of a first position in which the turbine wheel is retracted inside a tool body, a second position in which the turbine wheel is oriented to produce mechanical energy from the fluid stream, and a third position in which the turbine wheel is oriented to roll along an inner surface of the well.

The downhole tool may include a plurality of electrical generators. Each electrical generator may be mechanically coupled to one of the turbine wheels to convert the mechanical energy produced by the turbine wheel to electrical energy. The downhole tool may include an energy storage electrically coupled to the electrical generators to store the electrical energy. The downhole tool may include one or more wireless communication devices. The system may include a control system disposed at the surface region and in communication with the downhole tool through the wireless communication device(s). The downhole tool may include at least one tool to perform an operation in the well. The at least one tool may be selected from a production tool and a well stimulation tool. The downhole tool may include a plurality of mechanisms operable to position the turbine wheels at each of the first position, the second position, and the third position. Each of the mechanisms may be coupled between a respective one of the turbine wheels and the tool body.

In a third summary example, a method includes deploying a downhole tool into a well and leaving the downhole tool in the well with an axial axis of a tool body of the downhole tool aligned with a fluid flow direction in the well. The method includes transporting a fluid stream between the well and a surface region along the fluid flow direction. The method includes positioning the downhole tool in a first mode at one or more times during transporting the fluid stream by moving a plurality of turbine wheels of the downhole tool relative to the tool body and into a position and an orientation in which the fluid stream passes through the turbine wheels. The method includes positioning the downhole tool in a second mode at one or more times during transporting the fluid stream by moving the plurality of turbine wheels of the downhole tool relative to the tool body and into a position and an orientation in which the downhole tool is transportable along the well by rolling of the turbine wheels.

The acts of positioning the downhole tool in the first mode and positioning the downhole tool in the second mode may include receiving a command to switch a mode of the downhole tool from the surface region. The method may include detecting that a power level in an energy storage of the downhole tool is below a threshold prior to positioning the downhole tool in the first mode. The act of moving the plurality of turbine wheels of the downhole tool relative to the tool body during positioning the downhole tool in the first mode or the second mode may include moving the plurality of wheels from a retracted position inside the tool body to an extended position outside of the tool body. The method may include at least one of performing production logging and well stimulation while the downhole tool is in the second mode.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
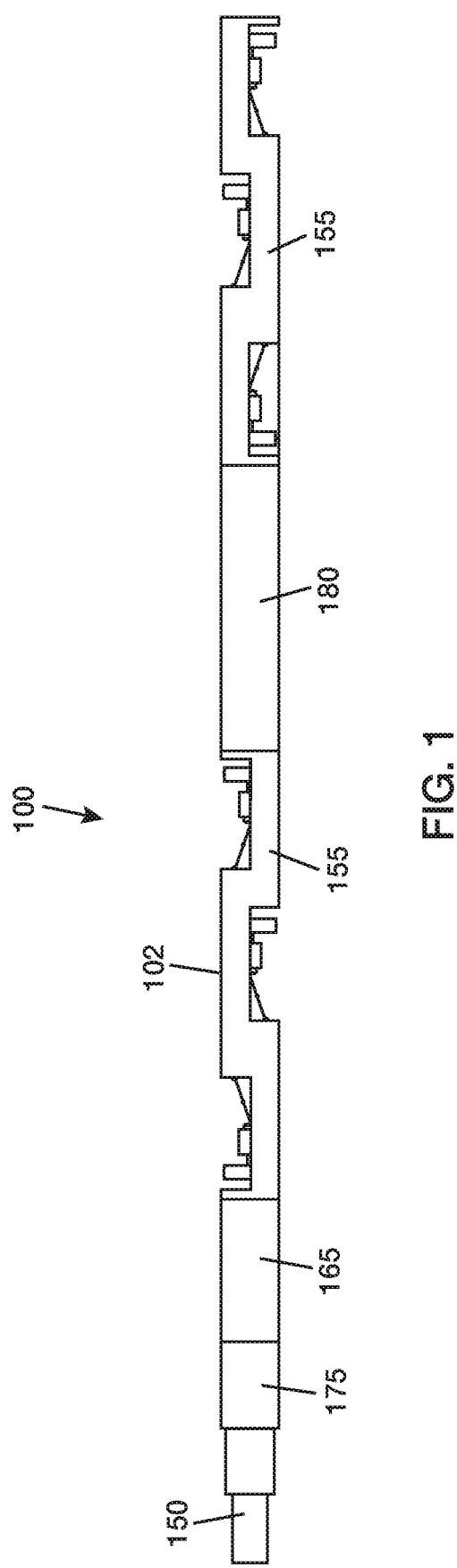
FIG. 1 is a schematic diagram of an autonomous downhole tool in an INACTIVE mode.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, related well known features or processes have not been shown or described in detail to avoid unnecessarily obscuring the implementations and embodiments. For the sake of continuity, and in the interest of conciseness, same or similar reference characters may be used for same or similar objects in multiple figures.

FIG. 1 shows an autonomous downhole tool 100 having a plurality of units or tools connected together to form an elongated body 102. In one implementation, autonomous downhole tool 100 includes one or more turbine units 155, a power management unit 165, a communication unit 175, and one or more operation tools 180. The arrangement of the units and tools is not limited to what is shown in FIG. 1, e.g., the order of the units and tools along the length of the autonomous downhole tool may be configured to optimize objectives such as balanced weight distribution and efficient power transmission.

Each turbine unit 155 includes components to harvest energy from fluid flow and enable transport of the autonomous downhole tool along an inner surface of a wellbore, which may be a surface of an open hole or a surface of a wellbore tubular lining the wellbore. Power management unit 165 includes components to store energy received from turbine units 155 and to distribute the stored energy to various components of the tool, such as operation tool 180, communication unit 175, and actuators in turbine units 155. Communication unit 175 includes components to send and receive wireless communication. Operation tool 180 performs an operation in a wellbore. For example, operation tool 180 may be a logging tool, such as a production logging tool, or a stimulation tool, such as a high power ultrasonic tool to perform wellbore descaling or near-wellbore stimulation. Operation tool 180 may further include tools for in-situ measurements of stress state/conditions and/or rock geomechanical properties, such as pressuremeter testing tool and scratch testing tool. Autonomous downhole tool 100 may have more than one operation tool.

Autonomous downhole tool 100 may include a fishing neck 150 attached to an end of elongated body 102. In the oilfield, a fishing neck provides a surface for a fishing tool to engage when retrieving a fish from a wellbore—a fish is an item left in a wellbore. For the autonomous downhole tool, fishing neck 150 may be selected to be engaged by a specific type of fishing tool, such as a catch-type tool, e.g., overshot or spear, or a screw-in tool. However, autonomous downhole tool 100 is not limited to any particular type of fishing tool and fishing neck. In general, it suffices that after leaving autonomous downhole tool 100 in a wellbore, autonomous downhole tool 100 can be retrieved using a conventional fishing operation.

Figure 2:
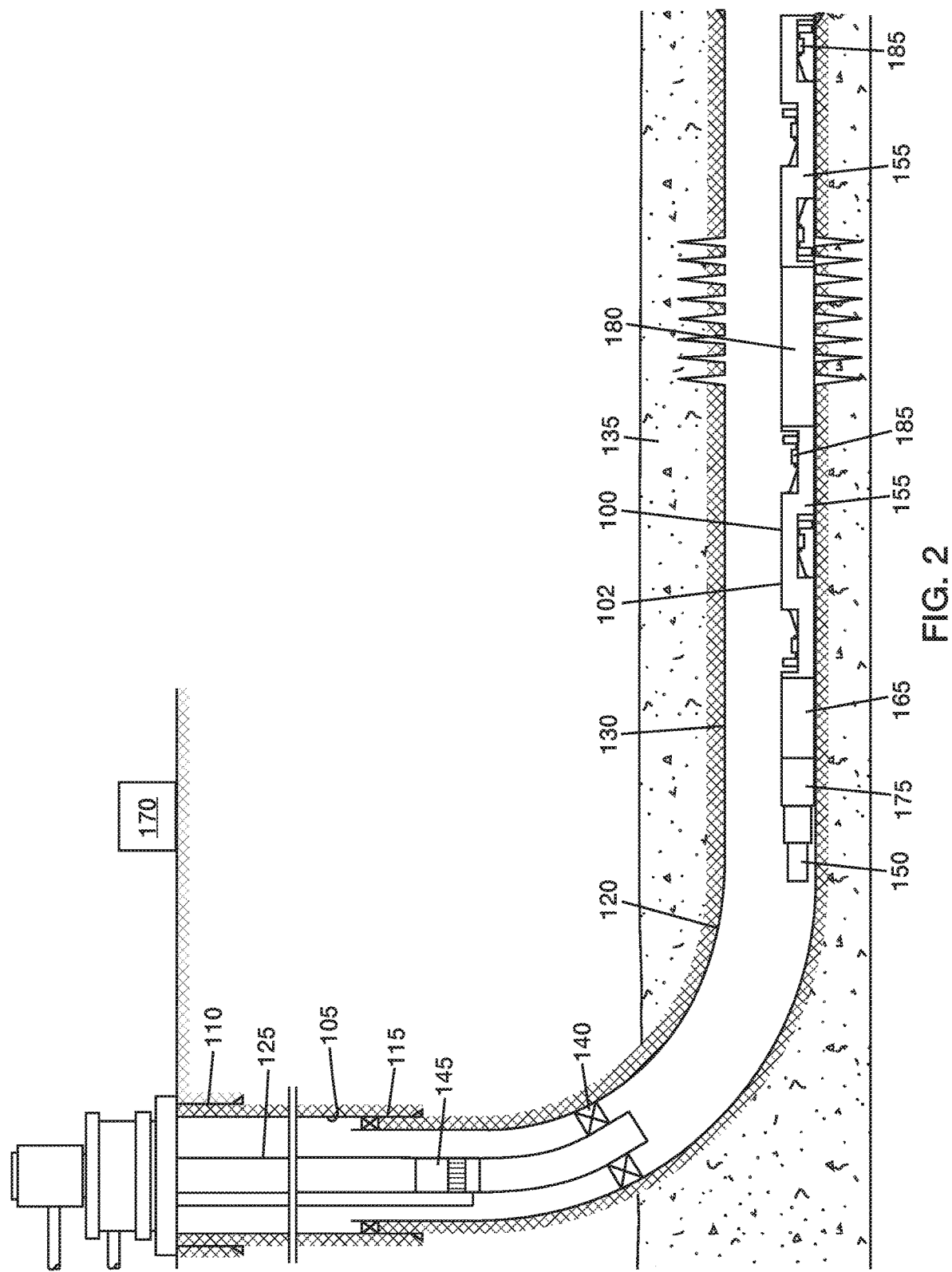
FIG. 2 is a schematic diagram of a completed well containing the autonomous downhole tool of FIG. 1 in the INACTIVE mode.

FIG. 2 shows autonomous downhole tool 100 in an example environment of use. As illustrated, autonomous downhole tool 100 is in a wellbore 105 that has been completed, for example, for production of hydrocarbons. For illustration purposes, casings 110, 115, a liner 120, and a tubing 125 are disposed inside wellbore 105 in a generally concentric arrangement. A liner is a type of casing that does not extend all the way to the surface when installed in a wellbore. In the illustrated example, liner 120 is hung off casing 115. The number of casings and whether a liner is used or not will depend on the plan used in drilling the wellbore. In the illustrated example, wellbore 105 includes a horizontal lateral section 130 that penetrates a zone 135 in a subsurface region. Liner 120 extends into horizontal lateral section 130 and may include perforations to enable reservoir fluids from subsurface zone 135 to enter into wellbore 105, if subsurface zone 135 is a production zone, or to allow injection fluids to be injected into subsurface zone 135, if subsurface zone 135 is an injection zone. A packer 140 may be set between tubing 125 and liner 120 to isolate subsurface zone 135. Tubing 125 serves as a conduit for transporting fluids between subsurface zone 135 and the surface. When producing fluids from the well, a fluid stream moves from subsurface zone 135 to the surface through tubing 125. The fluid stream direction is reversed when injecting fluids into subsurface zone 135. In one example, tubing 125 is a production tubing that produces reservoir fluids from subsurface zone 135 to a surface region, where the fluids may be diverted into flowlines. An artificial lift system 145, such as a pump, may be installed in tubing 125 to increase or leverage the energy of the fluids for production to the surface.

Autonomous downhole tool 100 may be deployed into wellbore 105 on the end of a wireline or coiled tubing. When autonomous downhole tool 100 is at the desired location in wellbore 105, the conveying wireline or coiled tubing can be disconnected from autonomous downhole tool 100 and retrieved to the surface, leaving autonomous downhole tool 100 in wellbore 105 as shown. Autonomous downhole tool 100 is shown in horizontal lateral section 130. However, autonomous downhole tool 100 is well-suited for operating in vertical, slanted, and horizontal wells and may be in a section of a well that is not horizontal, e.g., if the well is a vertical or slanted well. Fishing neck 150 will allow autonomous downhole tool 100 to be retrieved at a later time using a conventional fishing operation. The overall diameter of autonomous downhole tool 100 is smallest when autonomous downhole tool 100 is in an INACTIVE mode as shown in FIGS. 1 and 2. The overall diameter of autonomous downhole tool 100 can be selected such that autonomous downhole tool 100 in the INACTIVE mode can be deployed or retrieved through tubing 125. In the oilfield, for example, production tubing may range in size from ¾ inches to 4½ inches.

Each turbine unit 155 of autonomous downhole tool 100 includes a plurality of turbine generators 185. In the INACTIVE mode of autonomous downhole tool 100 shown in FIG. 2, turbine generators 185 are retracted within the body 102 of the tool. Autonomous downhole tool 100 has a RECHARGE mode and an OPERATION MODE in which turbine generators 185 are extended out of the body of the tool. In the RECHARGE mode, turbine generators 185 harvest energy from a fluid stream passing through the wellbore and produce electricity that can be stored in power management unit 165 for use by various elements of autonomous downhole tool 100. In the OPERATION MODE, turbine wheels of turbine generators 185 are used as wheels to transport autonomous downhole tool 100 along the wellbore.

Figure 3:
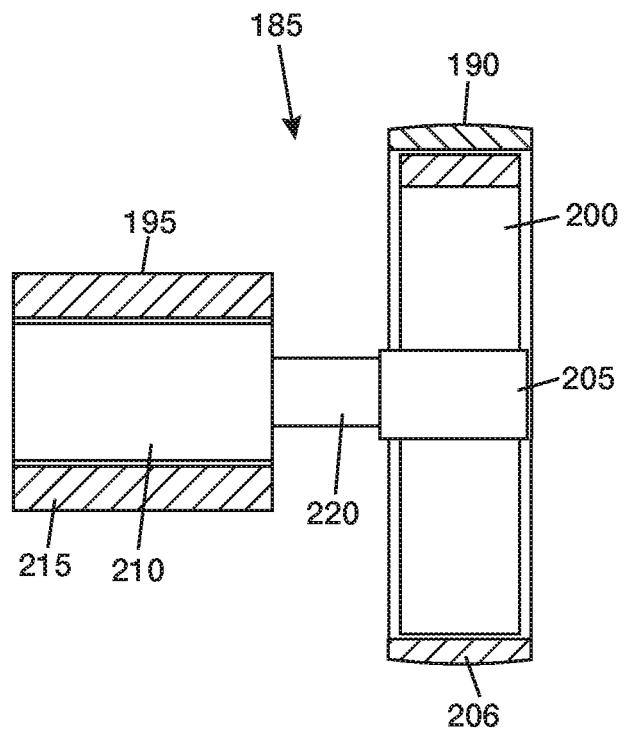
FIG. 3 is a schematic diagram of a turbine generator.

FIG. 3 shows one example of turbine generator 185 including a turbine wheel 190 and an electrical generator 195. Turbine wheel 190 includes turbine blades 200 mounted on a hub 205. In general, any known shapes and arrangement of turbine blades to form a turbine may be used. Turbine blades 200 are mounted within a cylindrical casing 206, forming a wheel that can roll along a wellbore wall or wellbore tubular in the OPERATION MODE of the autonomous downhole tool. Electrical generator 195 may include a rotor 210 that is rotatably supported within a stator 215. A turbine shaft 220 connects hub 205 to rotor 210. When fluid passes through turbine wheel 190, the force of the fluid will cause turbine blades 220 to rotate, which will result in rotation of turbine shaft 220 and rotor 210. Stator 215 may carry conductors (not shown separately), and rotor 210 may carry magnets (not shown separately). The ends of the conductors provide the terminals of the generator. As rotor 210 rotates, the magnets will move past the conductors, causing electricity to flow. The electricity can be stored in the power management unit of the autonomous downhole tool. Other types of electrical generators, synchronous or asynchronous, known in the art may be used in place of the particular electrical generator described above. In addition, in the particular electrical generator described above, the stator may carry the magnets while the rotor carries the conductors.

Figure 4:
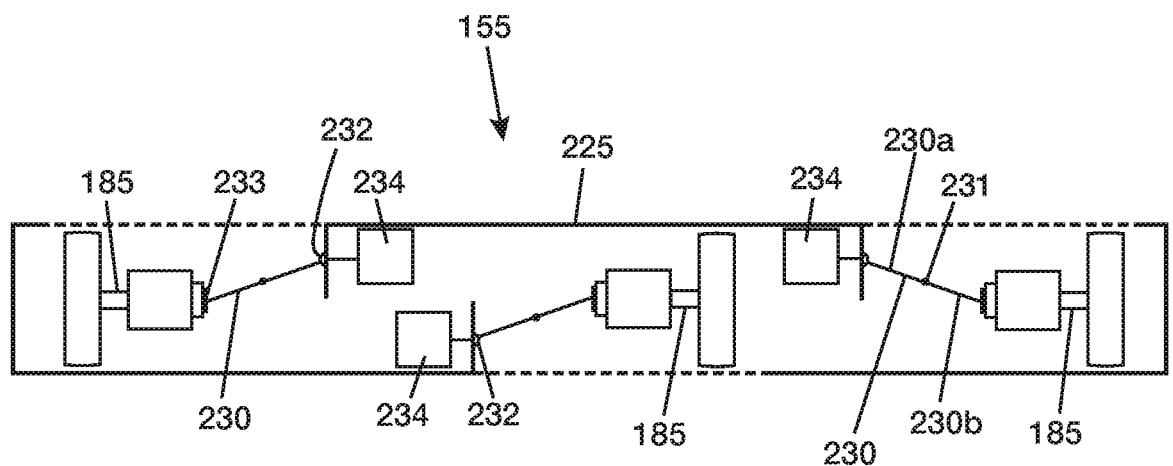
FIG. 4 is a schematic diagram of a turbine unit including turbine generators.

FIG. 4 shows one implementation of turbine unit 155 with three turbine generators 185. Turbine unit 155 includes a mechanism that is operable to move the respective turbine generator to various positions corresponding to the different modes of the autonomous downhole tool. In the example shown in FIG. 4, the mechanism for each turbine generator 185 includes a mechanical arm 230 coupling turbine generator 185 to tool body 225. In one example, mechanical arm 230 includes arm parts 230a, 230b connected together by a rotary joint 231. Arm part 230a may be coupled to tool body 255 by a pivot joint 232. Arm part 230b may be coupled to turbine generator 185 by pivot joint 233. Actuators 234, such as motors, may be provided to operate mechanical arm 230. In FIG. 4, turbine generators 185 are retracted within tool body 225, which corresponds to the INACTIVE mode of the autonomous downhole tool. By pivoting mechanical arms 230 at pivot joints 232, turbine generators 185 can be extended out of tool body 255 for the RECHARGE mode or OPERATION MODE of the autonomous downhole tool. By rotating arm part 230b relative to arm part 230a, orientation of turbine wheels 190 can be changed to conform with the desired mode of the autonomous downhole tool.

Figure 5:
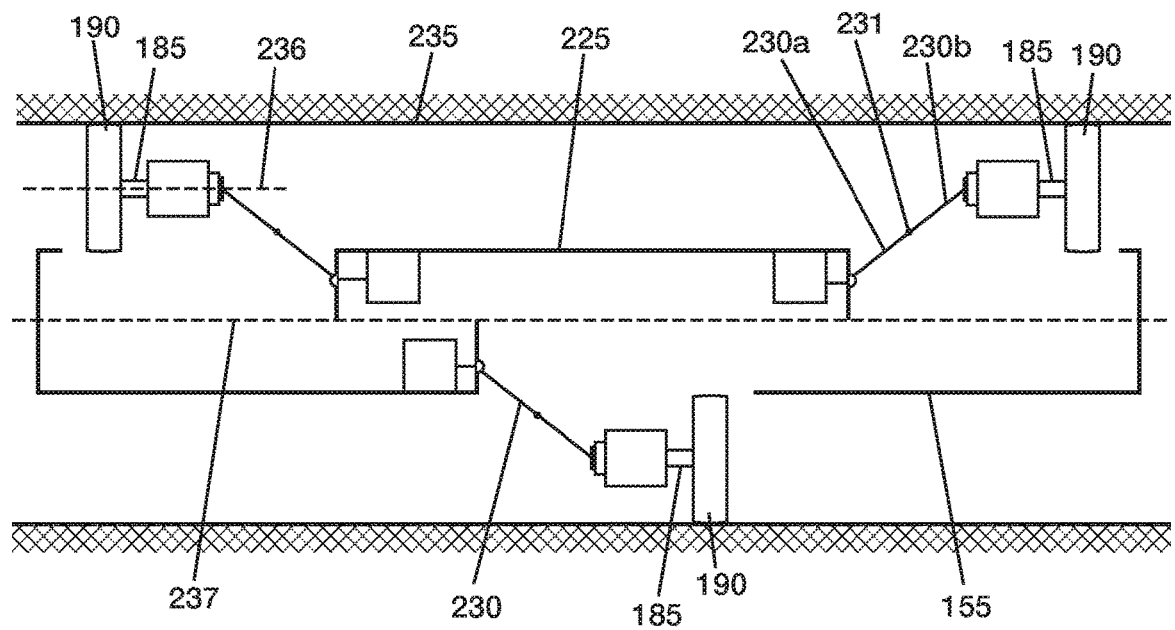
FIG. 5 is a schematic diagram of the turbine unit of FIG. 4 with the turbine generators positioned for a RECHARGE mode of the autonomous downhole tool.
Figure 6A:
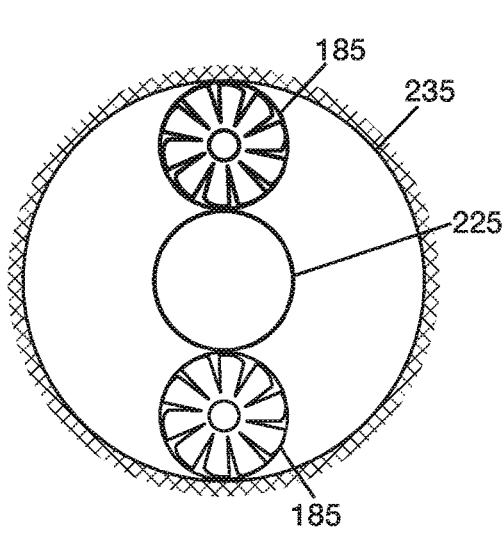
FIG. 6A is an end view of the turbine unit of FIG. 5 relative to a wellbore tubular.
Figure 6B:
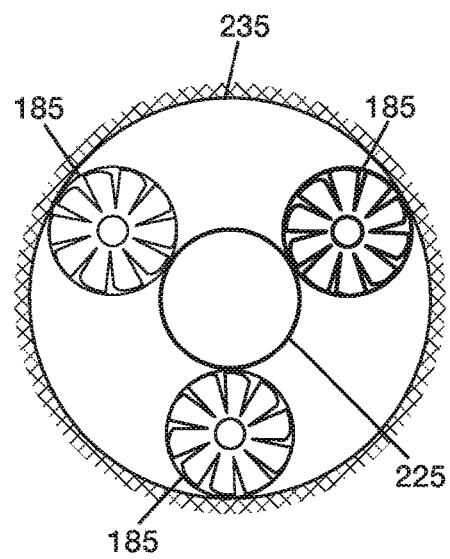
FIG. 6B is an alternative end view of the turbine unit of FIG. 5 relative to a wellbore tubular.

FIG. 5 shows turbine unit 155 within a portion of a wellbore tubular 235, which may correspond to a portion of liner 120 in FIG. 2. Mechanical arms 230 have been activated to extend turbine generators 185 out of tool body 255. Turbine wheels 190 of turbine generators 185 are in contact with the wall of wellbore tubular 235 and locked in position, e.g., by preventing further pivoting of mechanical arms 230. In this position, mechanical arms 230 and turbine generators 185 form a centralizing support for tool body 225 within wellbore tubular 235. FIGS. 6A and 6B show two examples of arrangements of turbine generators 185 around tool body 225. The arrangement shown in FIG. 6A corresponds to FIG. 5 (all the three turbine generators 185 are not visible in FIG. 6A because two of the turbine generators are aligned on the same side of tool body 225, as shown in FIG. 5). The arrangement shown in FIG. 6B is an alternative and provides a triangular support for tool body 225. The turbine generators 185 shown in FIG. 6B are spaced apart along an axial axis of tool body 225 in the same manner shown in FIG. 5. In general, any suitable arrangement that provides a centralizing support for tool body 225 within a tubular wall may be used.

Figure 7:
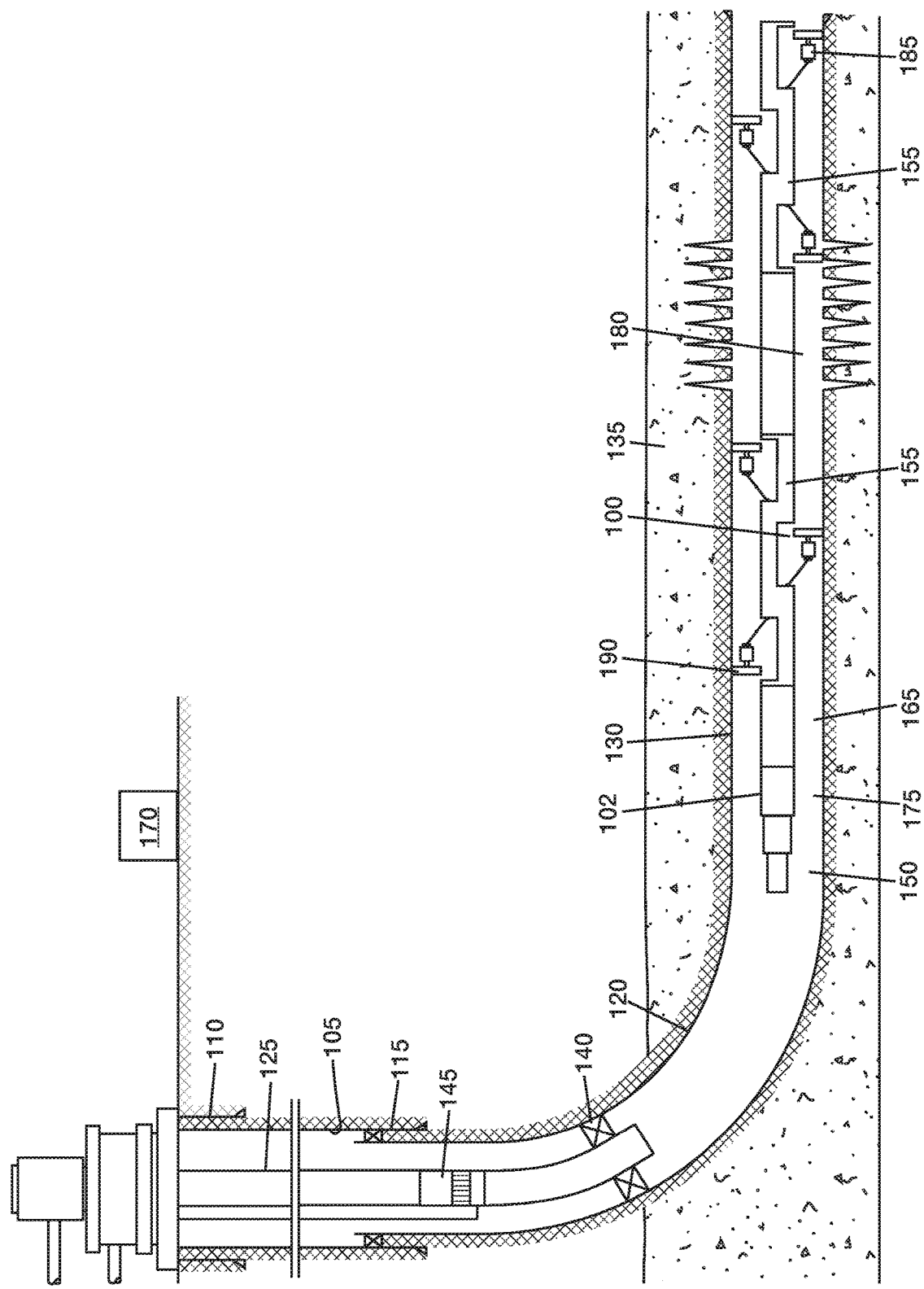
FIG. 7 is a schematic diagram of the completed well containing the autonomous downhole tool of FIG. 1 in the RECHARGE mode.
Figure 8A:
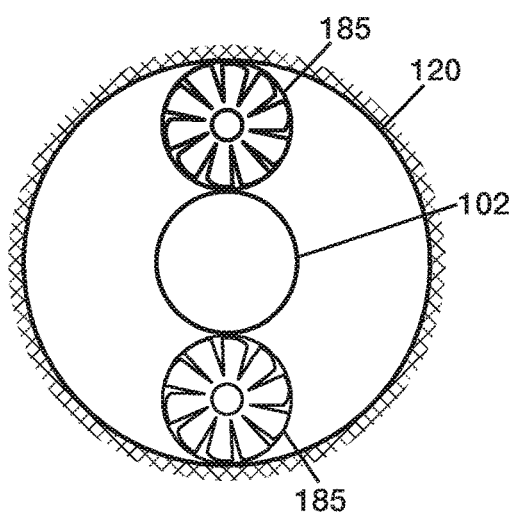
FIG. 8A is an end view of the autonomous downhole tool of FIG. 7 relative to a wellbore tubular.
Figure 8B:
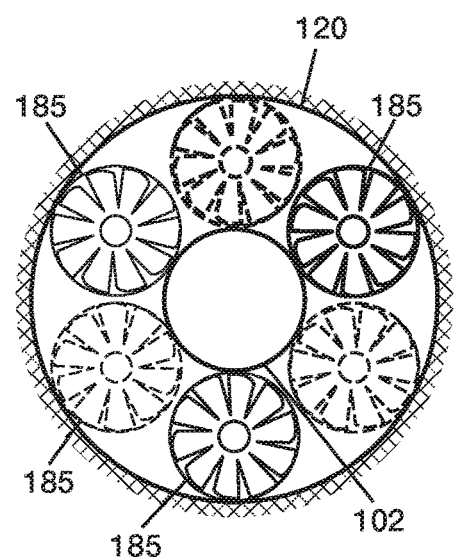
FIG. 8B is an alternate end view of the autonomous downhole tool of FIG. 7 relative to a wellbore tubular.

FIG. 7 shows turbine units 155 in the context of wellbore 105, with the turbine generators 185 extended such that the turbine wheels 190 engage liner 120 and are oriented to harvest energy from fluid flow through liner 120. The fluid flowing through liner 120 may come from subsurface zone 135. Turbine units 155 are now part of autonomous downhole tool 100, and the centering support provided by mechanical arms and turbine generators of the turbine units extends to the overall autonomous downhole tool. FIGS. 8A and 8B show two examples of arrangements of turbine generators 185 around the body 102 of the autonomous downhole tool. FIG. 8A is based on the two turbine units having the turbine generator arrangement shown in FIG. 6A and being rotationally aligned. FIG. 8B is based on the two turbine units having the turbine generator arrangement shown in FIG. 6B and being rotationally offset from each other—dotted and solid lines are used to differentiate the turbine wheels of the two turbine units. In general, any suitable arrangement of turbine generators and rotational alignment of turbine units that provide centering of the autonomous downhole tool body 102 within a tubular wall, such as within liner 120 in FIG. 7, may be used.

Figure 9:
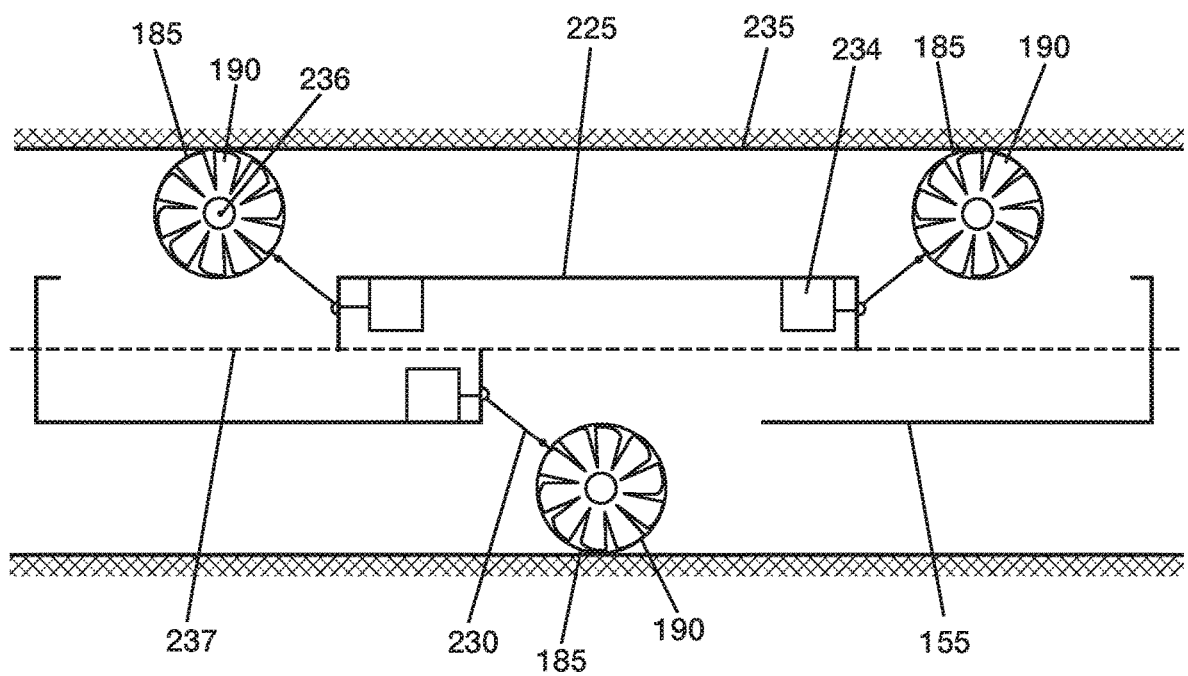
FIG. 9 is a schematic diagram of the turbine unit of FIG. 4 with turbine generators positioned for an OPERATION mode of the autonomous downhole tool.
Figure 10:
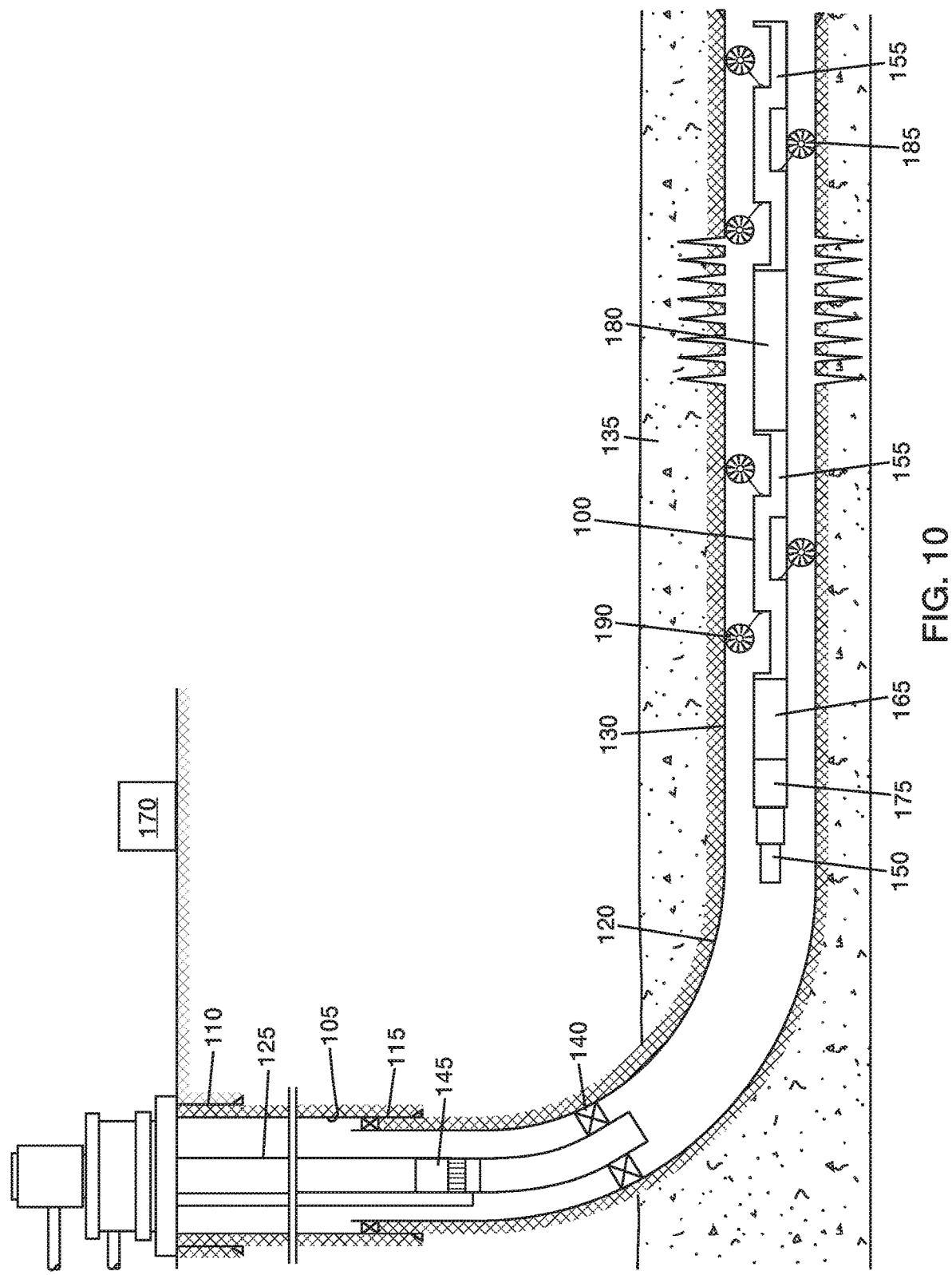
FIG. 10 is a schematic diagram of the completed well containing the autonomous downhole tool of FIG. 1 in the OPERATION mode.

Returning to FIG. 5, in the RECHARGE mode, an axial axis 236 of each turbine wheel 190 is parallel to an axial axis 237 of tool body 225. In this orientation, fluid flowing through tubular 235, generally in a direction parallel to tool body 225, will pass through turbine wheel 190 and result in generation of electricity that can be stored in the power section of the autonomous downhole tool. In one example, while turbine generators 185 are extended out of tool body 225, arm part 230b of mechanical arm 230 can be rotated about rotary joint 231 to place turbine wheel 190 in an orientation where axial axis 236 is perpendicular to axial axis 237 of tool body 225, as shown in FIG. 9. The orientation of turbine wheels 190 shown in FIG. 9 corresponds to the OPERATION MODE of the autonomous downhole tool. In this mode, turbine wheels 190 function as wheels that can roll along wellbore tubular 235. The same actuators used to position the turbine wheels 190 in the OPERATION mode, e.g., motors 234, can be used to move the turbine wheels along wellbore tubular in the OPERATION mode. FIG. 10 shows turbine units 155 in the context of wellbore 105, with the turbine generators 185 extended such that the turbine wheels 190 engage liner 120 and are oriented to roll along liner 120. During the OPERATION MODE of the autonomous downhole tool, operation tool 180 can perform operations in the wellbore, such as production logging or near-wellbore stimulation or in-situ measurement of conditions or properties of a nearby formation. The turbine wheels will allow the operation tool to be positioned at desired locations in which the operations are to be performed.

Figure 11:
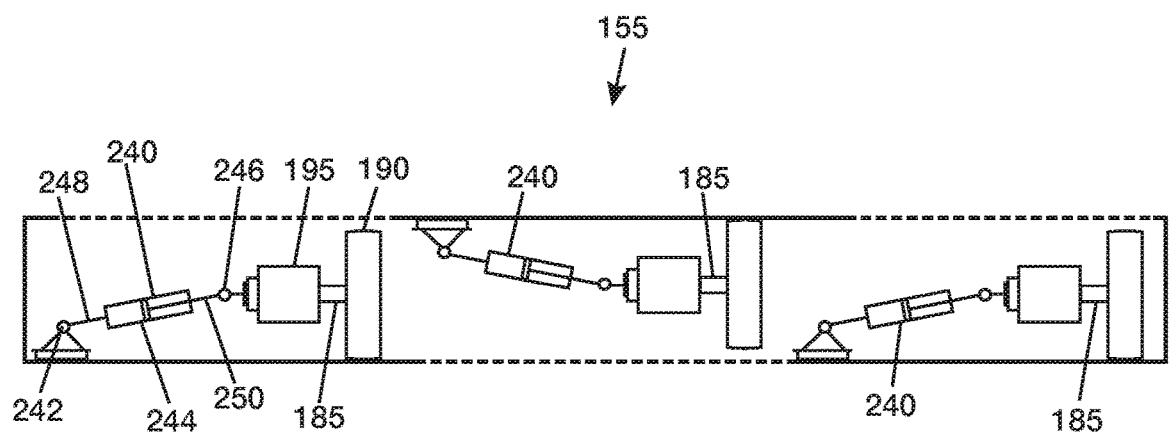
FIG. 11 is a schematic/kinematic diagram of robot manipulators coupled to turbine generators in a turbine unit.
Figure 12:
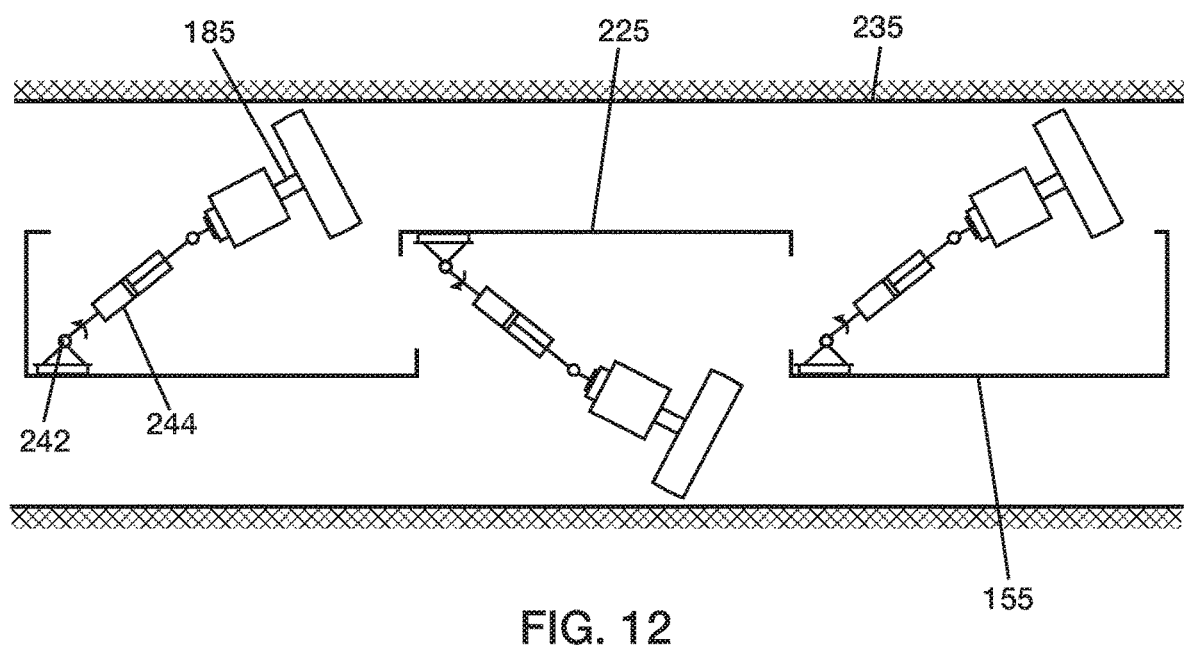
FIGS. 12-15 are schematic/kinematic diagrams showing a sequence of positioning turbine wheels in the RECHARGE mode of the autonomous downhole tool using the robot manipulators of FIG. 11.
Figure 13:
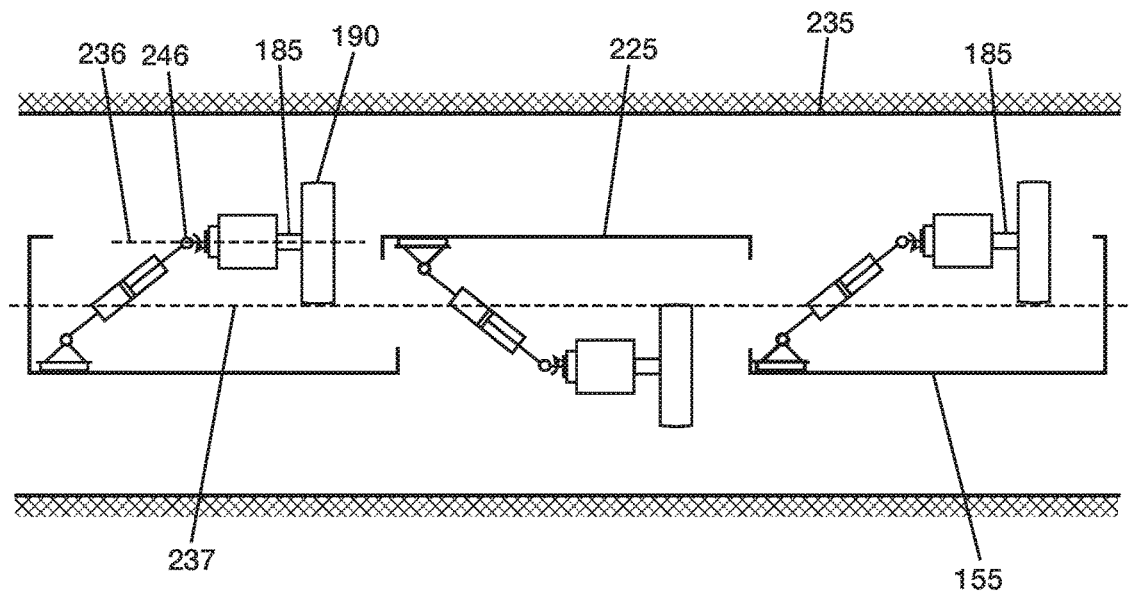
Figure 14:
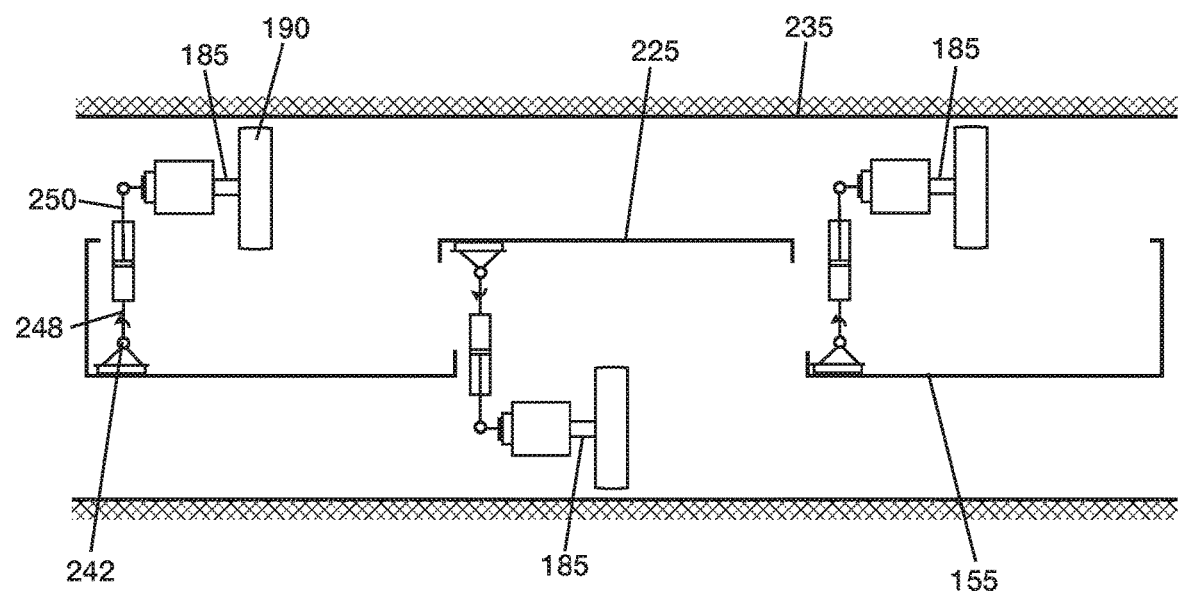
Figure 15:
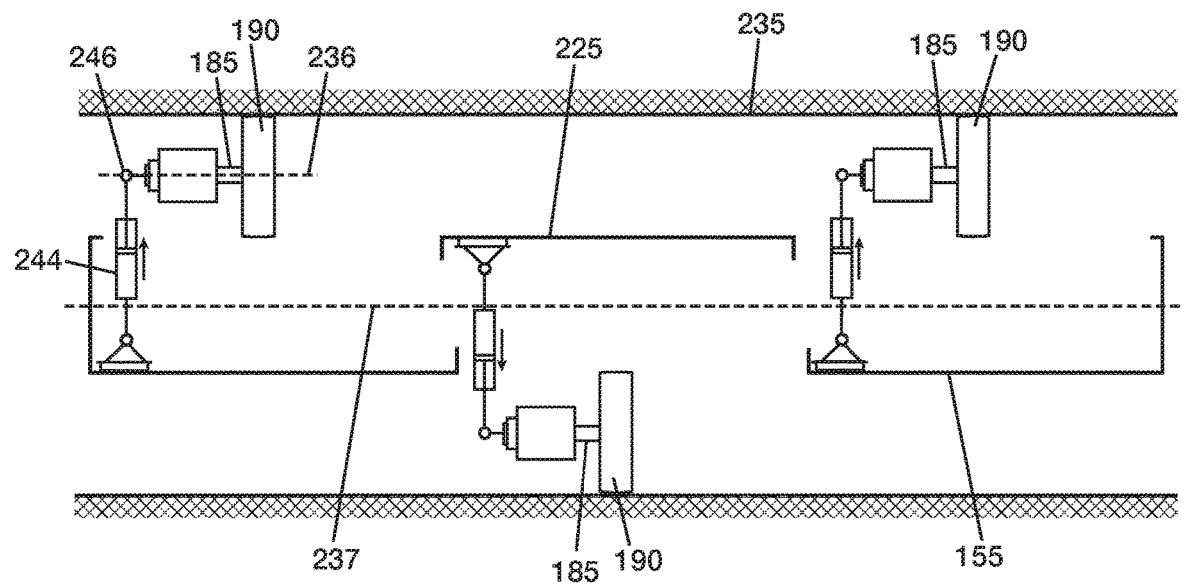
Figure 16:
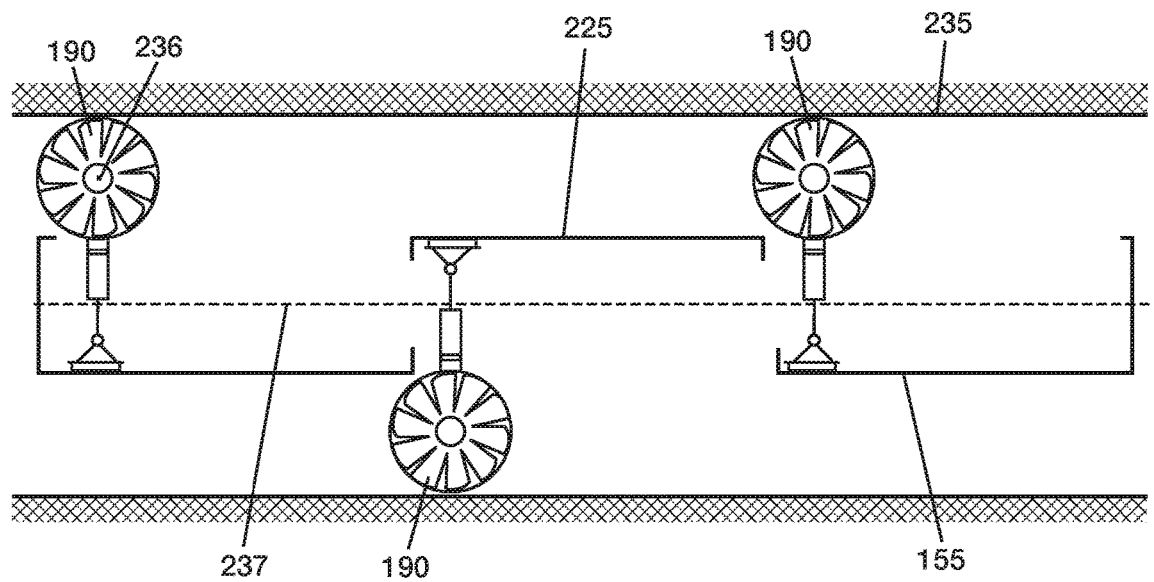
FIG. 16 is a schematic/kinematic diagram showing positioning of turbine wheels in the OPERATION mode of the autonomous downhole tool using the robot manipulators of FIG. 11.

FIG. 11 shows another mechanism 240 that may be used to position turbine generator 185 relative to tool body 225 in the three different modes of the autonomous downhole tool. Mechanism 240 may be a robot manipulator composed of links and joints. Mechanism 240 includes a revolute joint 242, a prismatic joint 244, and a spherical joint 246. A resolute joint allows relative rotation about one axis. A prismatic joint allows relative translation about one axis. A spherical joint allows three degrees of rotational freedom about the center of the joint. Each of these joints may be actuators that are controllable electronically. These joints are connected by links 248, 250. Links are rigid bodies. Mechanism 240 is coupled to tool body 225 at the revolute joint 242 and to turbine generator 185 at the spherical joint 246. FIGS. 12-15 show positioning of turbine generator 185 in the RECHARGE mode using mechanism 240. In FIG. 12, revolute joint 242 is actuated to extend turbine generator 185 out of tool body 225. In FIG. 13, spherical joint 246 is actuated to rotate turbine generator 185 to a position in which axial axis 236 of turbine wheel 190 is aligned with axial axis 237 of tool body 225. In FIG. 14, revolute joint 242 is actuated to rotate links 248, 250 to a vertical orientation. In some cases, rotation of links 248, 250 to the vertical may be omitted. In FIG. 15, prismatic joint 244 is actuated to extend turbine wheel 190 to contact wellbore tubular 235. To place the autonomous downhole tool in the OPERATION mode, spherical joint 246 can be actuated to rotate turbine generator 185 to a position in which the axial axis of turbine wheel 190 is perpendicular to the axial axis of tool body 225, as shown in FIG. 16. Spherical joint 246 can be actuated to move the respective turbine wheel 190 along a wellbore tubular in the OPERATION mode.

Figure 17:
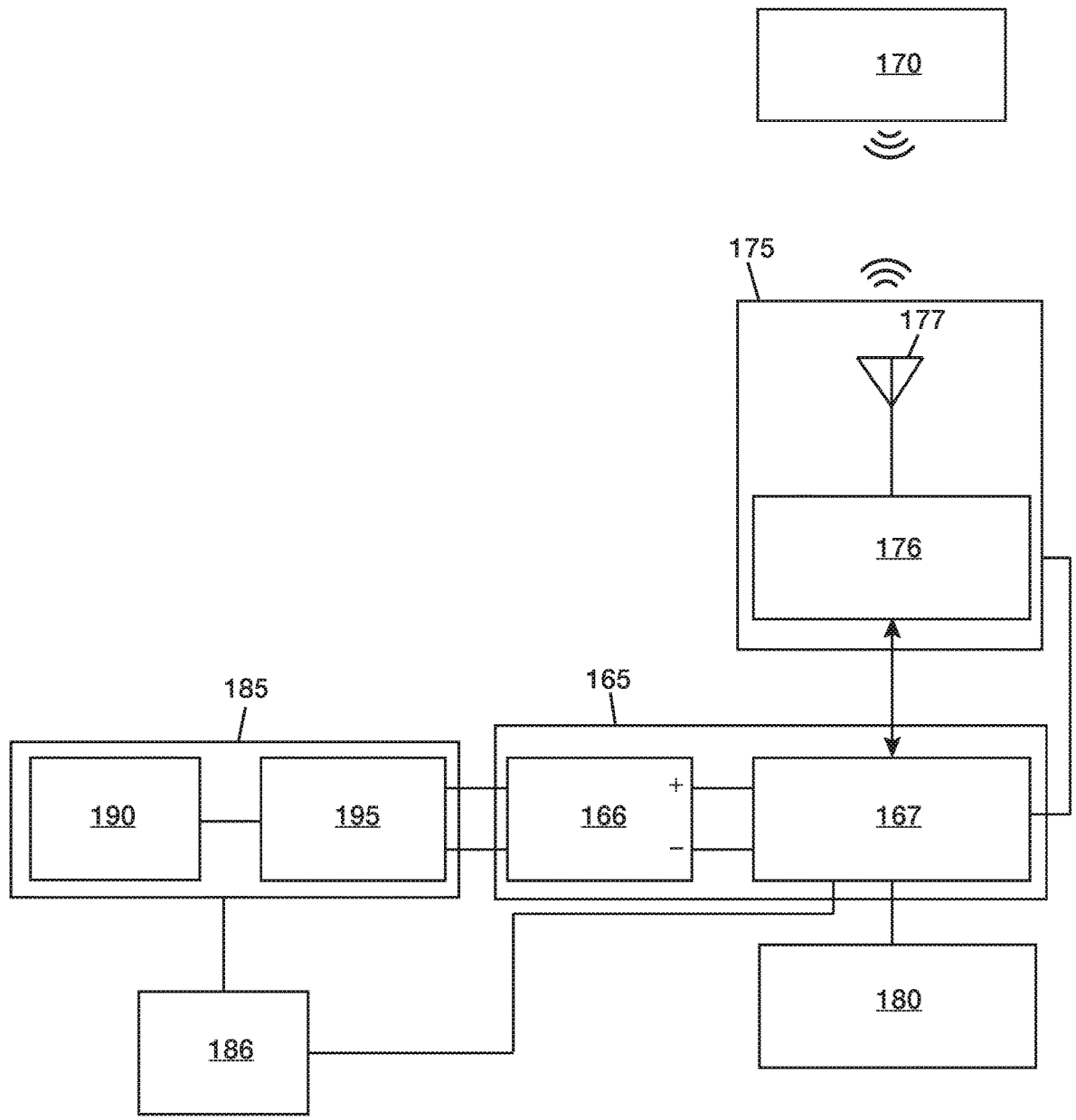
FIG. 17 is a block diagram representing operation of an autonomous downhole tool.

FIG. 17 shows an example system for operating autonomous downhole tool 100. The system includes turbine generators 185, controllable actuators in mechanisms that position turbine generators 185 relative to a tool body, generally identified as 186 in FIG. 17, power management unit 165, communication unit 175, operation tool 180, and surface control system 170. In one example, communication unit 175 includes wireless communication device(s), such as a transceiver 176 and an antenna 177, to enable wireless communication with surface control system 170. Transceiver 176 may use low power technologies, such as low-power Wi-Fi, Bluetooth, Bluetooth Low Energy, ZigBee, or LoRaWan. In one example, power management unit 165 includes an energy storage 166 and a low power signal processing circuit 167. Energy storage 166 may be a rechargeable battery or a capacitor-based storage using, for example, a regular capacitor de-rated for use at high temperatures, a ceramic capacitor, an electrolytic capacitor, or a supercapacitor. Energy storage 166 receives electrical energy from electrical generators 195 when autonomous downhole tool is in the RECHARGE mode. Energy storage 166 is operatively coupled to low power signal processing circuit 167.

Signal processing circuit 167 generally includes a processor and memory. Signal processing circuit 167 may be, for example, CMOS-based, microcontroller based, digital signal processor, DSP-based, field programmable gate array (FGPA)-based, application-specific integrated circuit (ASIC)-based, complex programmable logic device (CPLD), or a system-on-chip (SoC). Signal processing circuit 167 is in communication with communication unit 175, operation tool 180, and any controllable actuators 186 in mechanisms that position turbine generators relative to a tool body. Examples of controllable actuators 186 may be motors 234 in FIG. 4 and actuators at joints 242, 244, 246 in FIG. 11. Signal processing circuit 167 performs power management by interfacing with energy storage 166 to deliver appropriate system voltages and load currents to the components of autonomous downhole tool that require electrical power. Signal processing circuit 167 may transmit data to the surface and receive requests from the surface through communication unit 175.

Autonomous downhole tool 100 may be initially in the INACTIVE mode when deployed into a wellbore as shown in FIG. 2. Periodically, control system 170 may interrogate the autonomous downhole tool for the power level in energy storage 166, e.g., by sending a request to signal processing circuit 167 through communication unit 175 and receiving a response. If the response indicates that the power level is below a predetermined threshold, control system 170 may request signal processing circuit 167 to switch the autonomous downhole tool to the RECHARGE mode. Signal processing circuit 167 may execute this instruction by sending controls to any necessary controllable actuators 186 to extend turbine generators 185 out of the respective tool body and position the turbine wheels in an orientation to harvest energy. Turbine generators 185 may remain in the RECHARGE mode until another instruction is received from control system 170 to switch the mode. Alternatively, signal processing circuit 167 may include logic to determine when the power level is low and may automatically switch the autonomous downhole tool to the RECHARGE mode if the tool is currently in the INACTIVE mode. Alternatively, when signal processing circuit 167 receives instruction to switch the autonomous downhole tool to an OPERATION mode, signal processing circuit 167 may determine if the power level of energy storage 166 is sufficient prior to making the switch. If the power level of energy storage 166 is not sufficient, signal processing circuit 167 may place the autonomous downhole tool in the RECHARGE mode to bring the power level of the energy storage 166 to a level sufficient for the OPERATION mode prior to switching the autonomous downhole tool to the OPERATION mode.

When it is desired to perform an operation procedure, e.g., logging or stimulation, using operation tool 180, control system 170 may send a request to signal processing circuit 167 to switch the autonomous downhole tool to the OPERATION MODE. Switching the tool to the OPERATION MODE may include extending turbine generators 185 out of the tool body (if the tool is currently in the INACTIVE mode) and rotating the turbine wheels to an orientation in which the turbine wheels can roll along the wellbore or a wellbore tubular installed in the wellbore. If the power level becomes low during the OPERATION mode, the signal processing circuit may switch the autonomous downhole tool to the RECHARGE mode to generate electricity and then return the autonomous downhole tool to the OPERATION mode. Operation tool 180 may send data to control system 170 via communication unit 175 and signal processing circuit 167. Alternatively, a data collection device may be periodically deployed into the wellbore to collect data from the operation tool wirelessly.

Because autonomous downhole tool has its own self-generating power source, it can be deployed into the wellbore and left in the wellbore for long periods of time. In all the different modes of the tool, fluid can flow past the tool, which means that well production or injection can continue while autonomous downhole tool is in the wellbore and in any of the modes of the tool. Since the autonomous downhole tool is already in the wellbore, performing production logging or stimulation or in-situ measurements becomes as simple as sending a command to the tool to perform the operation. This allows production logging and stimulation to be performed more frequently, which may result in better control of production from the well.

The detailed description along with the summary and abstract are not intended to be exhaustive or to limit the embodiments to the precise forms described. Although specific embodiments, implementations, and examples are described herein for illustrative purposes, various equivalent modifications can be made without departing from the spirit and scope of the disclosure, as will be recognized by those skilled in the relevant art.

The invention claimed is:

1. An apparatus comprising:
   a tool body having an axial axis;
   a plurality of turbine wheels coupled to the tool body, each turbine wheel movable separately to each of a first position in which the turbine wheel is retracted inside the tool body, a second position in which the turbine wheel is extended out of the tool body and an axial axis of the turbine wheel is parallel to the axial axis of the tool body, and a third position in which the turbine wheel is extended out of the tool body and the axial axis of the turbine wheel is perpendicular to the axial axis of the tool body; and
   a plurality of electrical generators mechanically coupled to the plurality of turbine wheels, the plurality of electrical generators to convert mechanical energy produced by the plurality of turbine wheels to electrical energy; and
   an energy storage electrically coupled to the plurality of electrical generators to store the electrical energy.

2. The apparatus of claim 1, further comprising a fishing neck coupled to an end of the tool body, the fishing neck engageable by a downhole fishing tool for retrieval of the apparatus from a wellbore.

3. The apparatus of claim 1, further comprising at least one communication device coupled to the tool body for wireless communication.

4. The apparatus of claim 1, further comprising at least one wellbore operation tool coupled to the tool body.

5. The apparatus of claim 4, wherein the at least one wellbore operation tool is selected from a production logging tool and a wellbore stimulation tool.

6. The apparatus of claim 1, further comprising a plurality of mechanisms operable to position the turbine wheels at each of the first position, the second position, and the third position, each of the mechanisms coupled between a respective one of the turbine wheels and the tool body.

7. The apparatus of claim 6, wherein each of the mechanisms comprises a mechanical arm having two arm parts coupled together by a rotary joint.

8. The apparatus of claim 6, wherein each of the mechanisms comprises a robot manipulator.

9. A system comprising:
   a well penetrating a subsurface;
   a tubing disposed in the well for transport of a fluid stream between the subsurface region and a surface region; and
   a downhole tool disposed in the well and further down the well than a bottom end of the tubing, the downhole tool comprising a plurality of turbine wheels that are each movable separately to each of a first position in which the turbine wheel is retracted inside a tool body, a second position in which the turbine wheel is oriented to produce mechanical energy from the fluid stream, and a third position in which the turbine wheel is oriented to roll along an inner surface of the well.

10. The system of claim 9, wherein the downhole tool further comprises a plurality of electrical generators, each electrical generator mechanically coupled to one of the plurality of turbine wheels, the electrical generators to convert the mechanical energy produced by the turbine wheels to electrical energy.

11. The system of claim 10, wherein the downhole tool further comprises an energy storage electrically coupled to the electrical generators to store the electrical energy.

12. The system of claim 11, wherein the downhole tool further comprises one or more wireless communication devices.

13. The system of claim 12, further comprising a control system disposed at the surface region and in communication with the downhole tool through the one or more wireless communication devices.

14. The system of claim 13, wherein the downhole tool further comprises at least one tool to perform an operation in the well, the at least one tool selected from a production tool and a well stimulation tool.

15. The system of claim 14, wherein the downhole tool further comprises a plurality of mechanisms operable to position the turbine wheels at each of the first position, the second position, and the third position, each of the mechanisms coupled between a respective one of the turbine wheels and the tool body.

16. A method comprising:
deploying a downhole tool into a well and leaving the downhole tool in the well with an axial axis of a tool body of the downhole tool aligned with a fluid flow direction in the well;
transporting a fluid stream between the well and a surface region along the fluid flow direction;
positioning the downhole tool in a first mode at one or more times during transporting the fluid stream by moving a plurality of turbine wheels of the downhole tool relative to the tool body and into a position and an orientation in which the fluid stream passes through the turbine wheels; and
positioning the downhole tool in a second mode at one or more times during transporting the fluid stream by moving the plurality of turbine wheels of the downhole tool relative to the tool body and into a position and an orientation in which the downhole tool is transportable along the well by rolling of the turbine wheels.

17. The method of claim 16, wherein positioning the downhole tool in the first mode and positioning the downhole tool in the second mode comprise receiving a command to switch a mode of the downhole tool from the surface region.

18. The method of claim 16, further comprising detecting that a power level in an energy storage of the downhole tool is below a threshold prior to positioning the downhole tool in the first mode.

19. The method of claim 16, wherein moving the plurality of turbine wheels of the downhole tool relative to the tool body during positioning the downhole tool in the first mode or the second mode comprises moving the plurality of wheels from a retracted position inside the tool body to an extended position outside of the tool body.

20. The method of claim 16, further comprising at least one of performing production logging and well stimulation while the downhole tool is in the second mode.

* * * * *